Jan. 27, 1942.  C. H. WILL ET AL  2,271,134
AUTOMOBILE HEATER AND DEFROSTER
Filed April 19, 1937  4 Sheets-Sheet 1

INVENTORS
CARL H. WILL
HENRY W. FINK
BY Paul, Paul & Moore
ATTORNEYS

INVENTORS
CARL H. WILL
HENRY W. FINK
BY Paul, Paul & Moore
ATTORNEYS

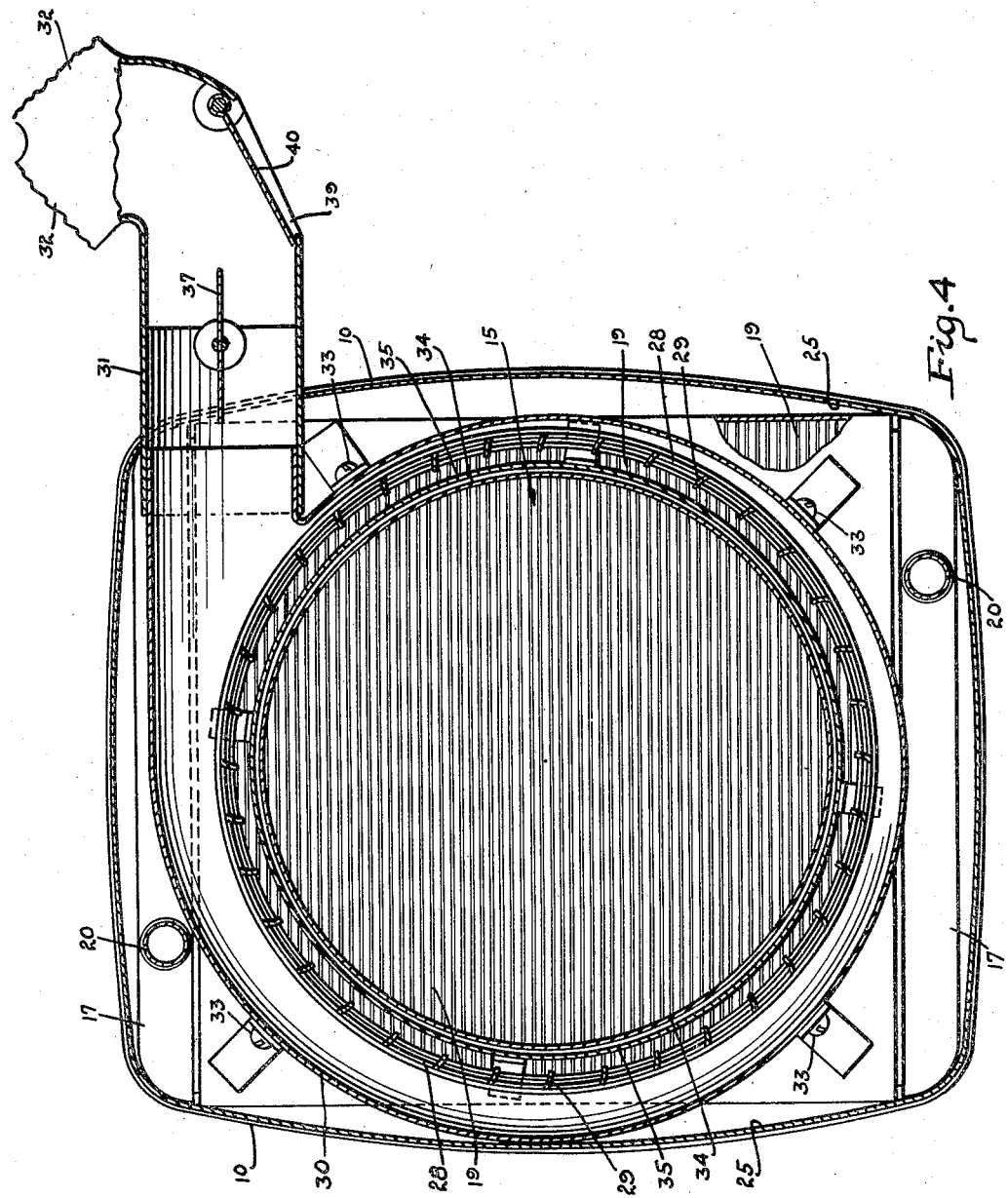

Jan. 27, 1942.  C. H. WILL ET AL  2,271,134
AUTOMOBILE HEATER AND DEFROSTER
Filed April 19, 1937  4 Sheets-Sheet 4

INVENTORS
CARL H. WILL
HENRY W. FINK
BY Paul, Paul & Moore
ATTORNEYS

Patented Jan. 27, 1942

2,271,134

UNITED STATES PATENT OFFICE 2,271,134

AUTOMOBILE HEATER AND DEFROSTER

Carl H. Will and Henry W. Fink, Minneapolis, Minn., assignors to Tropic-Aire, Incorporated, Minneapolis, Minn., a corporation of Delaware Application April 19, 1937, Serial No. 137,842

4 Claims. (Cl. 257—137)

This invention relates to improvements in combined automobile heaters and defrosters and has for its general object the production of a device of this character in which the structural elements and their functional relationship are such as to provide a more effective device than those heretofore produced for this purpose and which at the same time is cheaper to make and more easily installed.

One of the objects of our invention is to provide such a combined automobile heater and defroster in which the parts are so constructed and arranged that the overall depth of the assembly is not materially increased. This is important in view of the limited space for mounting heaters on the dash of automobiles of current body design.

Another object of our invention is to produce a device of the general character described in which, as compared with prior devices, a greater volume of heated air for defrosting purposes is delivered without affecting the efficiency of the heater in delivering warm air to the interior of the vehicle.

Still another object of the invention is to provide a device of the character described in which the air impeller for defrosting purposes is of greater diameter than the pressure fan and may therefore be operated at a lower R. P. M. without sacrificing volume of air delivered for defrosting, at the same time eliminating objectionable noise common to the types of air impellers now used for this purpose.

Still another object of the invention is to provide a device of the character described in which the air impeller comprises a single integral device rotatable in one direction and yet having its parts so formed that air may be moved in opposite directions simultaneously.

A further object of our invention is to provide a device of the character described in which a conventional type of motor having a single shaft may be used and in which the air impellers for heating and defrosting are mounted upon the same shaft.

A further object of the invention is to provide a device of the character described in which it is not necessary to construct special conduits or casings connecting the heating element or radiator with the casing for the defrosting air impeller, thus providing a more compact structure.

Other objects of the invention will be more fully brought out and will more clearly appear as the description of the invention proceeds.

In order to illustrate our invention in a practical form in which it may be embodied, we have appended hereto drawings showing a practical construction and one modification. It is to be understood, however, that these drawings are illustrative merely and that it is not intended to limit our invention to the details disclosed therein because it will be obvious to those skilled in the art that the details of construction may be varied without sacrificing any of the advantages of the invention and without departing from the scope thereof as defined in the appended claims.

In the drawings:

Fig. 4 is a cross-sectional view taken on line 4—4 of Fig. 3;

Generaly speaking, the heaters that we have chosen to illustrate as embodying our invention are of the so-called hot water type, which is to say, that the heating medium is hot water from the engine cooling system. Such a heater is now well known and has been for some years and is practically the only commercially available automobile heater at the present time.

However, it will be clear that the invention may be embodied in other heaters in which the heating medium may be derived from other sources. For example, the heater may be of the exhaust gas type when properly constructed to provide for the effective circulation of air; or, the heater may be a so-called self-contained unit in which the source of heat and the heating medium are not supplied from the engine; or, the heater may derived its heat from steam or hot air. In short, as will more clearly appear as the description proceeds, the construction of the heater itself is not important to our invention except insofar as the construction thereof co-operates with the novel elements of our combination to produce our new and useful device.

Figures 1, 2:
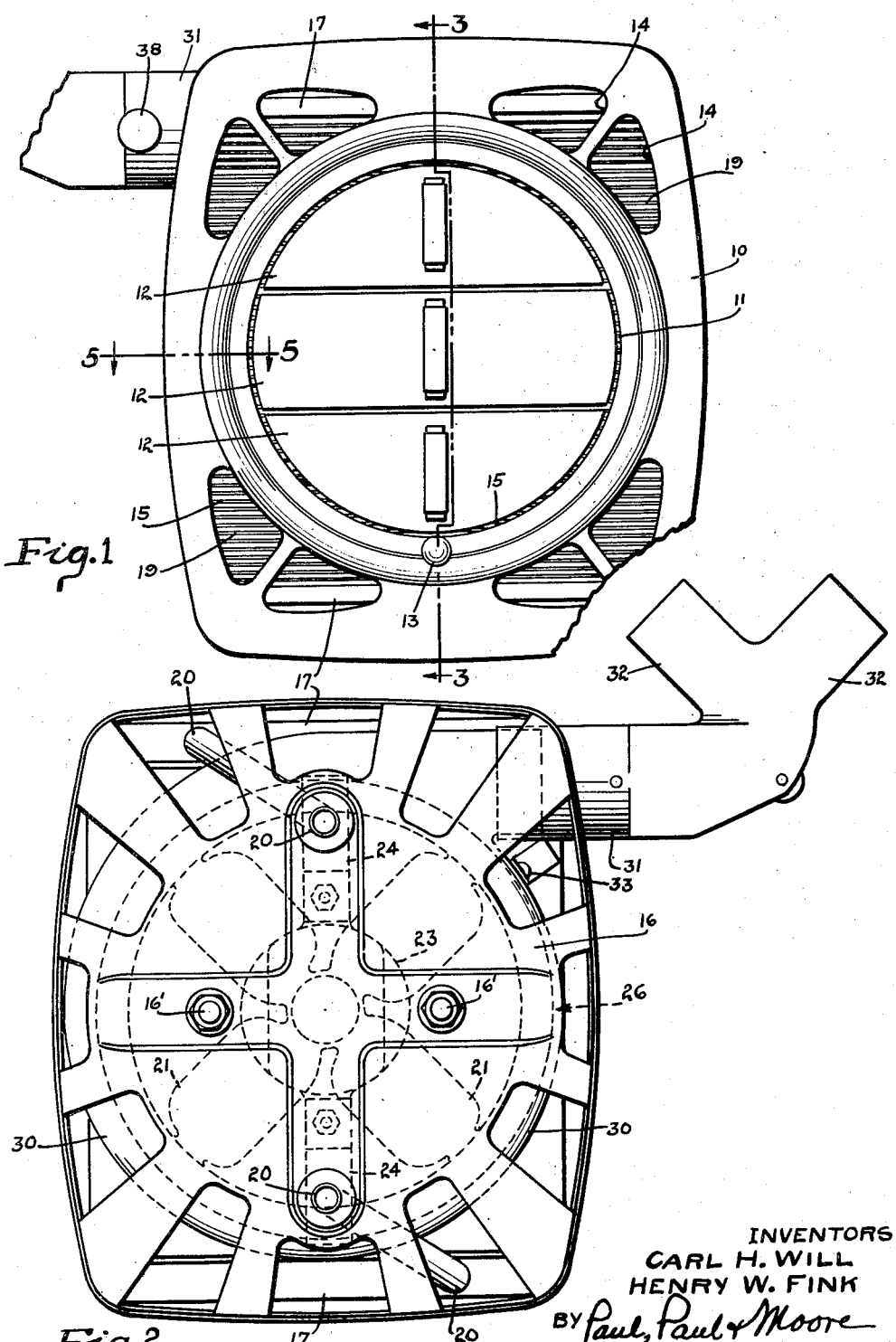
Fig. 1 is a front view of an automobile heater embodying our invention.
Fig. 2 is a rear view of the heater illustrated in Fig. 1.

Referring now to the drawings, Fig. 1 is a front view of an automobile heater in which our invention is embodied. In Fig. 1 is seen a front plate or shroud designated by the reference character 10 which has a substantially centrally located opening 11 covered by suitable deflectors or shutters 12. It will be understood, of course, that the number of deflectors or shutters is immaterial; it is only necessary that they be arranged and so mounted that they will substantially close off the central opening 11 when heat is not desired and that they may be opened and adjusted to various angular positions to direct the flow of air to any desired part of the vehicle.

In the particular embodiment herein shown the deflectors or shutters 12 are also rotatably adjustable by manipulation of a suitable knob or handle 13.

The front plate of the heater is provided with a plurality of openings 14 symmetrically located in the corners of the front plate for a purpose hereinafter to be pointed out.

A radiator structure generally indicated by the reference numeral 15 is partly visible through the openings 14 of the front plate and also through the central opening 11.

Fig. 2 is a rear view of the heater illustrated in Fig. 1 and shows the rear shroud 16 which surrounds the motor which operates the fan and blower as hereinafter pointed out and by which the heater is suitably supported on the dash of an automobile as, for example, by bolts 16'.

Figure 3:
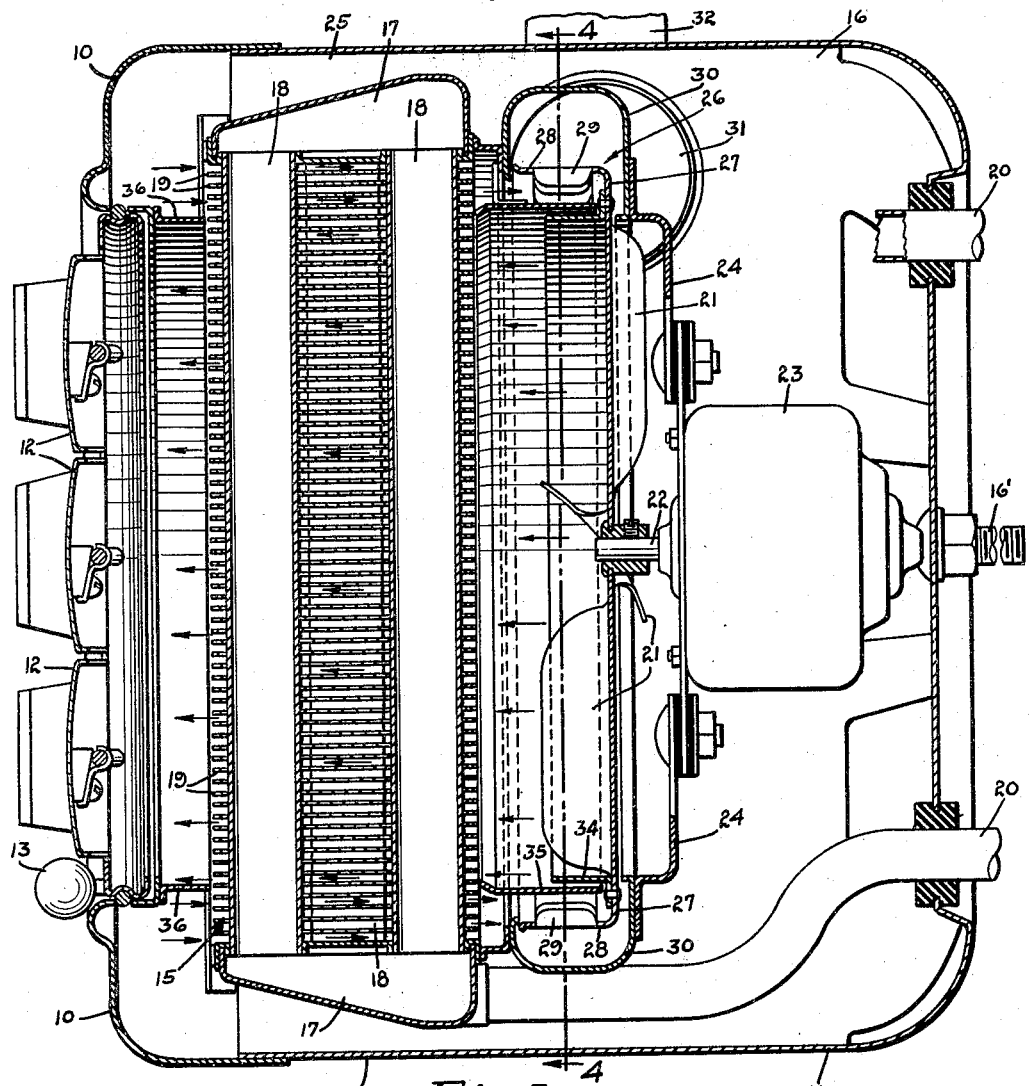
Fig. 3 is a cross-sectional view taken on line 3—3 of Fig. 1.
Figure 7:
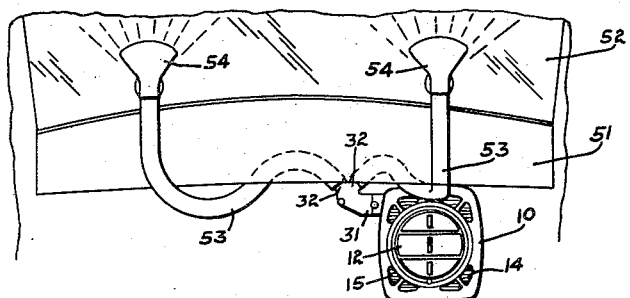
Fig. 7 is a fragmentary schematic view showing our combined heater and defroster installed in an automobile.

The construction of the heater and the arrangement of the pressure fan and centrifugal blower are best shown in Fig. 3. The heater includes a radiator structure or core generally designated 15, comprising headers 17 connected by a plurality of tubes 18 upon which are arranged a multiplicity of fins 19. Inlet and outlet pipes 20 are provided permitting ingress and egress of the heating medium to and from the headers 17.

It will thus be seen that the heater, itself, is of quite conventional construction. Assuming that the heating medium is hot water from the engine cooling system, such water enters through one of the pipes 20 into one of the headers 17 whence it passes through the tubes 18 into the other header 17 and out through the other pipe 20.

Means is provided for producing a forced circulation of air through the spaces or air passages between the fins 19 and around the tubes 18 as indicated by the arrows pointing to the left in Fig. 3. Said means comprises a pressure fan having blades 21 mounted on the shaft 22 of a suitable motor 23. We have illustrated an electric motor but it will be understood that any other type of motor may be used, such, for example, as an air-motor operated by the vacuum in the intake manifold of the engine. The motor may be supported in any suitable and convenient manner as, for example, by brackets 24.

A casing 25 surrounds the sides of the heater and may be made integral with the rear shroud 16 or separate therefrom, as desired.

It will be noted from an inspection of Fig. 3 that the blades 21 of the pressure fan are located quite close to the rear of the case 15 so that the overall depth of the heater from front to back is no greater than that of conventional hot water heaters now on the market. Yet, within this depth, we have provided a separate air impeller or blower for delivering air for defrosting purposes and this is also located within the confines of the casing 25.

The centrifugal blower or air-impeller for defrosting is indicated generally by the reference numeral 26. Its internal diameter is preferably equal to the diameter of the pressure fan so that the blower may be described as surrounding the fan, or located at the periphery of the fan. Said centrifugal blower comprises a ring member 27 provided with an axially bent peripheral flange 28 from which vanes or blades 29 are struck and bent inwardly and substantially radially.

Figure 6:
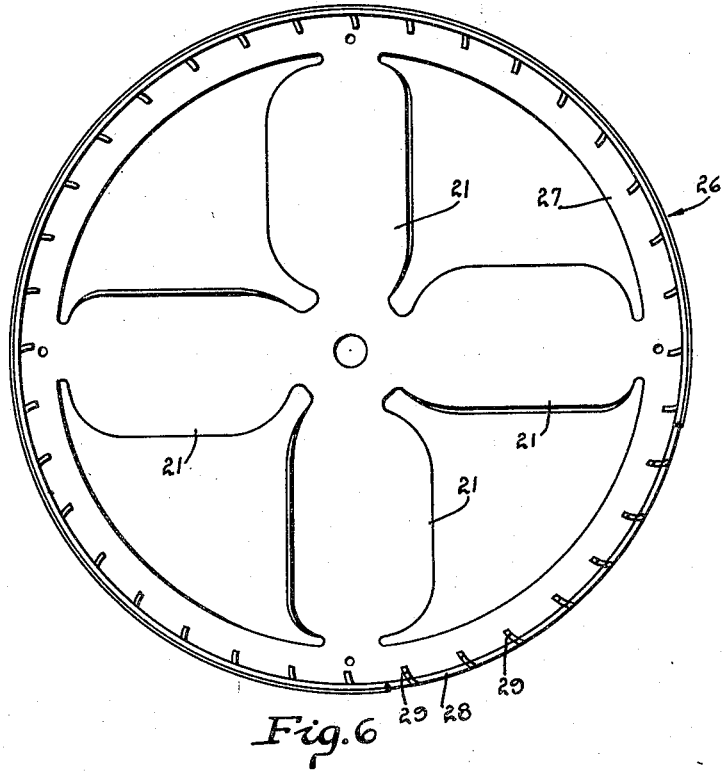
Fig. 6 is a plan view of the combined fan and blower which is embodied in the heater shown in the preceding identified figures.
Figure 5:
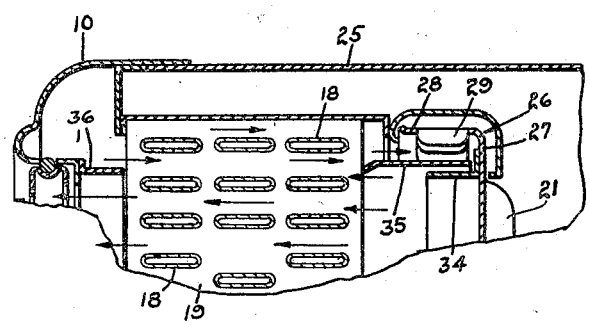
Fig. 5 is a fragmentary cross-sectional view taken substantially on line 5—5 of Fig. 1.

As shown particularly in Fig. 6, the pressure fan and centrifugal blower are integrally formed from a single piece of suitable material by proper punching and bending. This makes a very simple and inexpensive combined fan and blower which may be mounted as a unit upon a motor shaft for rotation and for simultaneously impelling air through the heater core in opposite directions.

While the integral formation of the fan and blower represents, we believe, a desirable construction which is a material advance in the art, it will, nevertheless, be understood that the blower may be made separately and then fastened to the ends of the fan blades by suitable securing means. For the compactness we desire to achieve, it is only necessary that the blower shall be located substantially at the periphery of the pressure fan and within the same plane whether or not the blower is actually carried by the fan.

The blower 26 operates in a spiral chamber or casing 30 which communicates with an outlet port or pipe 31. Said pipe 31 may be provided with one or more branches 32 to which may be connected suitable hose leading to the windshield of the automobile for conducting hot air thereto, as shown, for example, in our copending application, Ser. No. 101,097, filed Sept. 16, 1936. The provision of two branches 32 in Y formation, as shown in Fig. 2, permits the attachment of two hoses leading to separate sections of the windshield.

The casing 30 is preferably removably and adjustably supported at the back of the heater core as by suitable bolts 33. By this arrangement the said casing may be rotated on the heater so that the outlet pipe 31 will always point in the same direction (usually towards the driver) whether the heater be mounted vertically or horizontally upon the dash.

A ring 34 is carried by and rotatable with the combined fan and blower and cooperates with a stationary ring 35 to confine and guide the flow of air from the pressure fan and to provide an inner wall for the casing 30, thus separating the air streams created by the two impellers.

At the front of the heater, between the core 15 and the front plate 10, we have provided a stationary ring 36 which also serves to keep the air streams separate. The ring 36 is of substantially the same diameter as the ring 35.

As indicated by the arrows in Fig. 3, the pressure fan impells air to the left in said figure while the centrifugal blower draws air to the right. By the arrangement shown and described, these two oppositely moving streams of air are prevented from interfering.

The openings 14 at the front of the heater provide inlets for air to the casing 30 of the blower by way of the marginal portions of the radiator core while the central opening 11 permits the exit of air which is forced through the central portion of the core by the fan. Thus, the two air streams are heated by different portions of the same radiator core while passing therethrough simultaneously in opposite directions.

Making the diameter of the blower such that it in effect surrounds the fan enables us to place the blower and its casing close to that part of the radiator core through which air is to be drawn and dispenses with separate ducts or conduits which would otherwise have to be provided. This makes for compactness as well as cheapness in manufacture.

It is well known that the pressure created by a centrifugal fan or blower is proportional to the square of its peripheral speed. Hence, with a blower of so relatively a large diameter as that we have provided, the peripheral speed required for a given pressure can be obtained at a low R. P. M. with resultant diminution of noise. Quietness in operation without sacrificing air delivery is one of the important features of our invention.

It will be noted, also, that the blower casing 30 and the combined fan and blower may be removed and an ordinary pressure fan mounted on the motor shaft when the defrosting feature is not desired. Thus, we provide a universal construction which may be easily converted from a combined heater and defroster to a simple heater of conventional design.

In the outlet pipe 31 we have located a damper or valve 37 which may be operated by a knob or handle 38. When the valve or damper 37 is in closed position it shuts off the flow of air from the blower casing 30. This results in reducing the load on the motor and increases the R. P. M. of the pressure fan.

The outlet pipe 31 is also provided with a port or opening 39 which may be shut off by a valve or damper 40 operated by any suitable means within reach of the driver. When the valve 40 is shut, as shown in Fig. 4, all the air issuing from the pipe 31 will pass to the hoses connected to the branches 32 for defrosting. The valve 40 may be opened to any desired extent to permit a portion of the air to pass downwardly toward the floor for footwarming purposes.

The foregoing description will make clear our invention. It will now be seen that we have provided a combined automobile heater and defroster in which the objects of the invention heretofore set forth have been attained. It will be clear, of course, that the structural details may be changed without sacrificing the advantages pointed out and it will be understood that we do not confine ourselves to the particular details illustrated and described.

In Fig. 2 we have illustrated more or less schematically the arrangement in an automobile of a combined heater and defroster of our invention. In said figure, reference numeral 51 indicates the instrument board of the automobile and 52, the windshield. There is shown mounted upon the dash a combined heater and defroster similar to that illustrated in Fig. 1. Connected to the branches 32 are suitable flexible hose 53 provided with nozzles 54 which are placed close to the windshield so that warm air from the blower will pass through the said hose to the said nozzles 54 to be impelled against the windshield.

We claim as our invention:

1. In a combined heater and defroster, a heating radiator provided with air passages, a substantially spiral casing secured in close proximity to said heating radiator with its interior in direct communication with certain of said air passages, a blower in said casing, and a fan for impelling air axially through such of said air passages as are not in communication with said casing.

2. In a combined heater and defroster, a heating radiator provided with air passages, a substantially spiral casing secured in close proximity to said heating radiator with its interior in direct communication with certain of said air passages, a blower in said casing, a fan for impelling air axially through such of said air passages as are not in communication with said casing, and common means for operating said blower and said fan.

3. In a combined heater and defroster, a heating radiator provided with air passages, a substantially spiral casing secured in close proximity to said heating radiator with its interior in direct communication with certain of said air passages, a blower in said casing, a fan for impelling air axially through such of said air passages as are not in communication with said casing, a motor having a shaft, and means for mounting said blower and said fan upon said shaft.

4. In combination, a heat exchange device comprising a housing, a radiator core disposed within said housing and means for circulating air through said radiator core, said means comprising an inner fan driving air into said core, an outer fan withdrawing air from said core, a conduit in which said outer fan rotates and an annular shell integrally formed with said inner and outer fans and cooperating with said conduit for separating the zones in which each of said fans is effective.

CARL H. WILL.
HENRY W. FINK.